Figure 1:
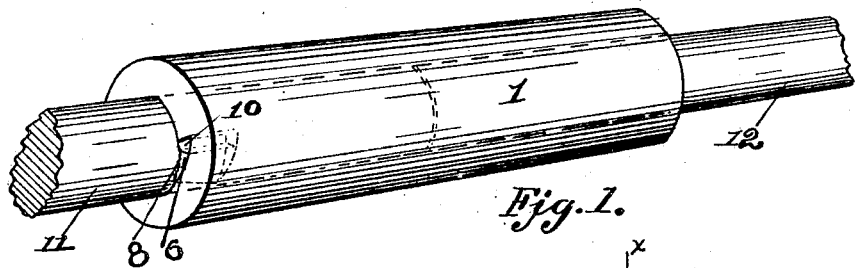

No. 799,975. PATENTED SEPT. 19, 1905.
J. R. CRISTE & M. T. GORMAN.
COUPLING FOR SHAFTS AND PULLEYS.
APPLICATION FILED MAY 13, 1905.

Witnesses.
E. A. Rudolph.
R. H. Butler.

Inventors.
J. R. Criste
M. T. Gorman
By N. C. Evert & Co.
Attorneys.

UNITED STATES PATENT OFFICE.

JAMES R. CRISTE AND MICHAEL T. GORMAN, OF BRADDOCK, PENNSYLVANIA.

COUPLING FOR SHAFTS AND PULLEYS.

No. 799,975.　　　Specification of Letters Patent.　　　Patented Sept. 19, 1905.

Application filed May 13, 1905. Serial No. 260,235.

*To all whom it may concern:*

Be it known that we, JAMES R. CRISTE and MICHAEL T. GORMAN, citizens of the United States of America, residing at Braddock, in the county of Allegheny and State of Pennsylvania, have invented certain new and useful Improvements in Couplings for Shafts and Pulleys, of which the following is a specification, reference being had therein to the accompanying drawings.

This invention relates to certain new and useful improvements in shaft-couplings; and the invention has for its object the provision of positive and reliable means for effectually retaining the confronting ends of two shafts together, whereby the shafts will serve functionally as if they were one solid shaft.

Our invention aims to provide a novel form of sleeve in which the confronting ends of two shafts are mounted, and in connection with the sleeve we employ novel means for locking the sleeve in connection with the shafts, whereby the shafts will rotate in unison.

Briefly described, our improved coupling comprises a sleeve in which the confronting ends of two shafts are adapted to be mounted, and each end of the sleeve is recessed to receive a wedge-shaped serrated locking member adapted to engage the shafts mounted within the sleeve. The serrated locking members are positioned within the sleeve, whereby the rotation of the shafts will have a tendency to more firmly lock the members within the sleeve and in engagement with the shafts.

The above construction will be hereinafter more fully described and then specifically pointed out in the claims, and, referring to the drawings accompanying this application, like numerals of reference designate corresponding parts throughout the several views, in which—

Figure 2:
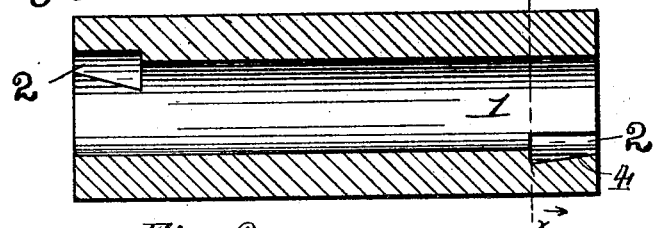
Figure 3:
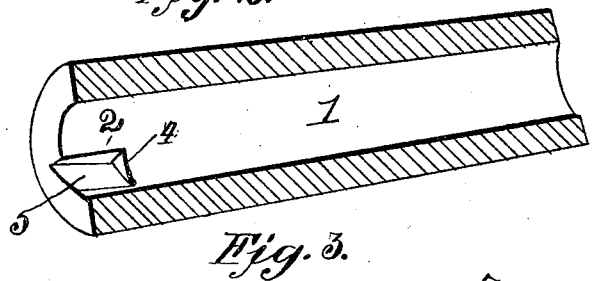
Figure 4:
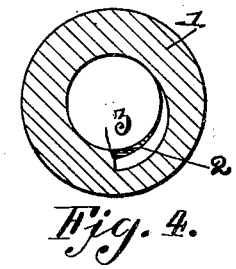
Figure 5:
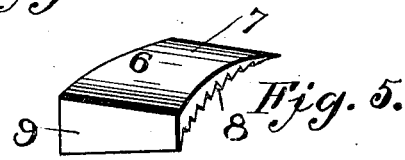
Figure 6:
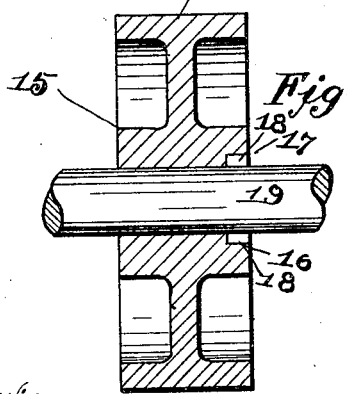
Figure 7:
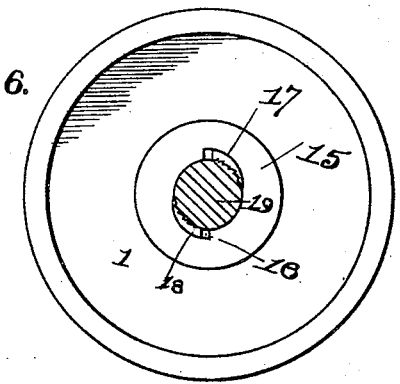
Figure 8:
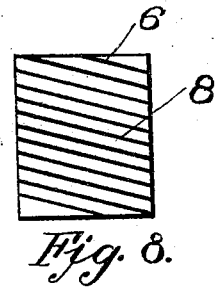

Figure 1 is a perspective view of our improved coupling, illustrating the same in position upon the confronting ends of two shafts. Fig. 2 is a longitudinal sectional view of the same. Fig. 3 is a similar view partly in perspective. Fig. 4 is a vertical sectional view taken on the line $x\ x$ of Fig. 2 looking in the direction of the arrow. Fig. 5 is a perspective view of a locking member used in connection with our improved coupling. Fig. 6 is a vertical sectional view of a pulley mounted upon a shaft. Fig. 7 is a side elevation view of the same, and Fig. 8 is a bottom plan view of a locking member employed in connection with our improved coupling.

To put our invention into practice, we employ a sleeve 1, the inner side walls of which are provided at each end of the sleeve with recesses 2 2, located diametrically opposite each other. The recesses are formed a short distance within the ends of the sleeve, and each recess has a vertical wall 3 and a rear wall 4, the bottom of each recess tapering rearwardly into the sleeve, as designated by the reference-numeral 4, (see Fig. 2,) and each recess is formed in the sleeve approximately one-quarter of the inner circumference of the same, the bottom 5 of the recess being beveled until it intersects the inner circumference of the sleeve. The formation of the recesses 2 2 provides substantially wedge-shaped seats for locking members 6 6. The one face 7 of the locking members conforms to the contour of the bottom 5 of the recesses 2 2, while its opposite face is serrated, as indicated at 8, and conforms in contour to the inner circumference of the sleeve 1. The locking members 6 are substantially the same shape in cross-section as the recesses 2 2—that is, the rear wall 9 of the locking members corresponding approximately in depth to the rear wall of the recesses 2 2 and the angularity of the face 7 is adapted to correspond with the inwardly-tapering bottom 5 of the recess.

In order to mount the locking members within the recesses 2 2, it is necessary that the locking members be made shorter than the recesses—that is, the recesses being approximately one-quarter of the circumference of the sleeve the locking members are made approximately one-sixth of the circumference of the sleeve, this construction permitting of a space 10 existing in the rear of each locking member when they are secured within the sleeve. On account of the shape of the locking members and the recesses it is necessary that this space exist in order that the locking members can be placed in the large end of the recesses and then moved into engagement with the shafts 11 and 12, mounted within the sleeve 1, In operation the rotation of the shafts 11 and 12 tends to drive the locking members 6 farther into the recesses 2 2, consequently driving the serrated surfaces 8 of the locking members into further engagement with the shafts 11 and 12. To firmly retain the shafts 11 and 12 within the sleeve, we preferably form the serrations or teeth 8 of each member at an angle, as clearly illustrated in Fig. 8 of the drawings, these teeth tending to hold the ends of the shafts 11 and 12 within the sleeve and prevent any longitudinal movement of the shafts within the sleeve. In order to hold the locking members within their respective recesses and prevent any longitudinal movement of said members or prevent the members from moving out of their respective recesses, we have made the members and recesses substantially wedge-shaped in cross-section, whereby, after the locking members have been once moved around within the recesses, it will be impossible for any outward movement of the locking members to take place independently of the sleeve, and as a locking member is placed in each end of a sleeve it will be impossible for the shafts mounted within said sleeve to become separated or disconnected from said sleeve.

In Figs. 6 and 7 of the drawings we have illustrated a pulley or wheel 14, the hub portion 15 of which is provided with recesses 16 and 17, similar to the recesses 2 2 heretofore described, and in connection with said recesses we employ locking members 18 18, similar to the locking members 6, and these locking members are employed for retaining the pulley or wheel 14 upon the shaft 19.

It is thought from the foregoing that the construction, operation, and advantages of the herein-described machine will be apparent without further description.

What we claim, and desire to secure by Letters Patent, is—

1. The combination with two shafts, of a sleeve adapted to receive said shafts, the ends of said sleeve having diametrically-opposed recesses formed therein, said recesses being wedge-shaped in a direction longitudinally of the sleeve, corresponding substantially wedge-shaped members adapted to fit within said recesses, said members having serrated faces adapted to engage said shafts, substantially as described.

2. The combination with shafts, of a sleeve adapted to receive said shafts, the ends of said sleeve having diametrically-opposed recesses formed therein, said recesses being substantially wedge-shaped in cross-section, the bottoms of said recesses gradually tapering toward the inner surface of said sleeve, substantially wedge-shaped members adapted to fit within said recesses, said members having serrated faces adapted to engage said shafts, substantially as described.

3. The combination with shafts, of a sleeve adapted to receive said shafts, the ends of said sleeve having diametrically-opposed recesses formed therein, locking members mounted in said recesses, and adapted to engage said shafts, said recesses increasing in depth gradually from their outer to their inner ends and said locking members being correspondingly tapered to prevent longitudinal movement of said members within said sleeve, substantially as described.

In testimony whereof we affix our signatures in the presence of two witnesses.

JAMES R. CRISTE.
MICHAEL T. GORMAN.

Witnesses:
K. H. BUTLER,
E. E. POTTER.